March 13, 1956 R. M. BELL 2,737,873
AIRCRAFT CABIN PRESSURE REGULATOR
Filed Nov. 4, 1953 2 Sheets-Sheet 1

CABIN

INVENTOR.
RAYMOND M. BELL
BY
ATTORNEY

March 13, 1956  R. M. BELL  2,737,873
AIRCRAFT CABIN PRESSURE REGULATOR
Filed Nov. 4, 1953  2 Sheets-Sheet 2
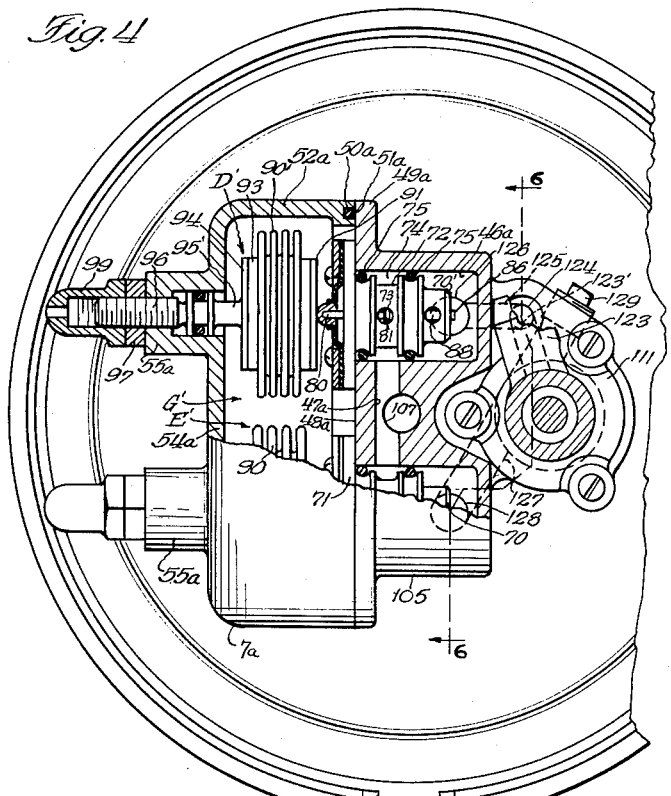
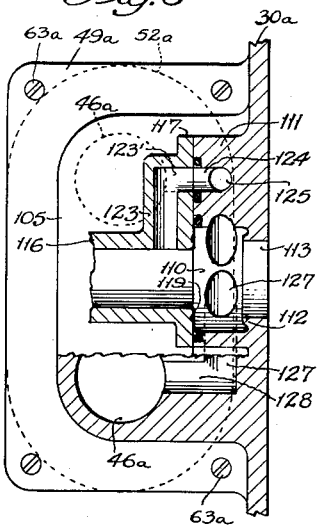
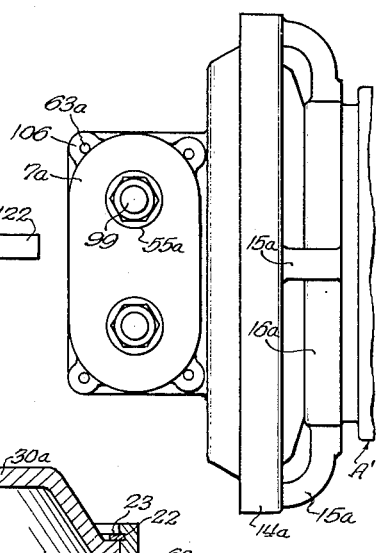
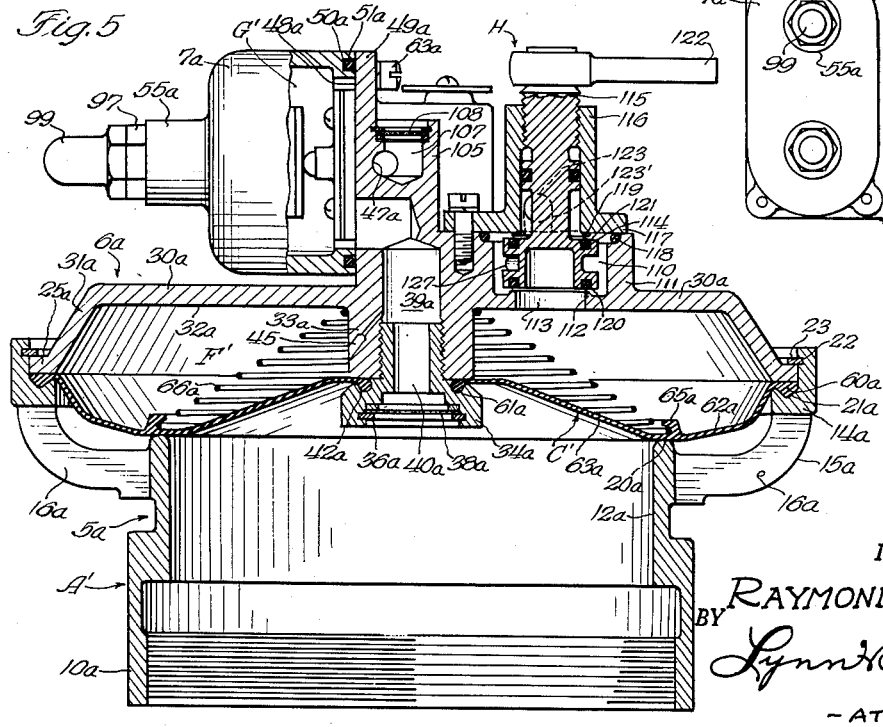
INVENTOR.
RAYMOND M. BELL
BY Lynn Latta
— ATTORNEY —

United States Patent Office 2,737,873
Patented Mar. 13, 1956

2,737,873

AIRCRAFT CABIN PRESSURE REGULATOR

Raymond M. Bell, Burbank, Calif., assignor to Pacific Airmotive Corporation, Burbank, Calif.

Application November 4, 1953, Serial No. 390,179

19 Claims. (Cl. 98—1.5)

This invention relates to aircraft cabin pressure regulators in general, and, in particular, to regulators of the type wherein a diaphragm, responsive to a balance of cabin pressure and ambient pressure acting against separate areas of one face thereof, and a controlled pressure acting against the other face thereof, functions both as a valve actuating servomotor and as the movable valve element of the regulator valve which controls pressure within an aircraft cabin by regulating the outflow of the air from the cabin to ambient atmosphere.

More particularly, the invention relates to a regulator of the type outlined above, wherein the controlled pressure acting against the one face of the diaphragm is controlled by a plurality of pilot valves which control the flow of air from a high pressure area such as the cabin atmosphere, through a control chamber which is incorporated in the regulator, and thence to atmosphere. In this type of regulator, such pilot valves commonly include an isobaric control for regulating cabin pressure at a selected fixed value (e. g. a fixed pressure corresponding to atmospheric pressure at a selected elevation such as 8000 or 10,000 feet above sea level) together with a differential pressure control for regulating cabin pressure at a fixed differential between cabin pressure and ambient pressure which may be selected primarily to conform to an established safety factor within the limit at which the excess of cabin pressure over atmospheric pressure would tend to rupture the wall structure of the cabin. Other pilot valves, governing cabin pressure to meet additional requirements which may become important at high altitudes in connection with the rate of ascent or descent, are commonly incorporated in regulators of the general class herein contemplated, and may or may not be incorporated in the regulator of this invention. Since the invention does not deal specifically with such control pilots, they are not herein illustrated.

Cabin pressure regulators are commonly mounted inside the pressurized body of the aircraft fuselage, usual locations being within the pilot's compartment, and in a tail compartment (e. g. a washroom) and in most cases they are fairly inaccessible, requiring the removal of other fixtures before they can be reached for repair or servicing. An important object of the invention is to provide a regulator which can be installed in an unpressurized space, directly accessible for servicing from outside the plane through a small door in the skin of the fuselage. As the primary basis for attaining this end, the invention contemplates a regulator wherein the control chamber, instead of being located on the cabinward side of the diaphragm as is customary in conventional regulators, is disposed on the side which faces outwardly toward ambient atmosphere. The valve seat faces outwardly away from the cabin; the valve housing is exposed directly to approximately ambient pressure; the cabin outlet communicates with a central duct leading to the valve seat and to the central area of the diaphragm; cabin pressure is thus applied directly to the central region of the diaphragm; and air escapes from the central duct outwardly past the valve seat and through a series of annular discharge ports disposed at the periphery of the regulator. The pressure responsive control devices (e. g. bellows) of the pilot valve are located in a bellows chamber within the casing on the outer (atmospheric) side of the diaphragm, but are directly exposed to cabin pressure transmitted through the center of the diaphragm. From this bellows chamber, air passes through a fixed restricted bleed into an intermediate pressure control chamber at the outer face of the diaphragm, thus providing a fixed flow of high pressure air into the control chamber; and the control chamber pressure is determined by outflow therefrom directly to an ambient pressure area through discharge ports in the side of the regulator casing, under the control of the pilot valves which are located immediately outwardly of the control chamber.

In the conventional regulator of the type above outlined, the diaphragm is fixedly supported at its periphery and the remaining area of the diaphragm is free to move in response to changes in the balance of pressures on the respective sides thereof. The operation of such a diaphragm is governed by the principle that the effective area thereof is approximately one half its actual area, pressure differentials being more effective against the freely movable central portion of the diaphragm than against the peripheral area thereof which is anchored at the periphery of the diaphragm. In such a diaphragm, in determining the proportions of the two areas on the one face of the diaphragm, which are subjected to different pressures (cabin pressure and ambient pressure) equal pressure responsive effectiveness is obtained by proportioning the areas so that the central area is approximately one-half the extent of the outer area, thus compensating for the pressure responsiveness of the outer area being roughly one half that of the inner area.

When such a diaphragm lifts away from the valve seat, there is a tendency for the distribution of pressures on the dual pressure side of the diaphragm to change as the result of the flow of air across the valve seat, and the unbalancing effect of this change in distribution is aggravated by the unequal proportioning of the two diaphragm areas. In short, such a diaphragm is quite sensitive, tends to be unstable and to flutter in the central area thereof, and must be carefully designed (as to its cross sectional contour) in order to maintain a satisfactory operational responsiveness at various positions between fully closed and fully opened positions.

In a common type of regulator, the diaphragm is pierced at the center by a tubular stem which bleeds air from the control chamber to the low pressure side of the diaphragm. A bearing bushing in the center of the diaphragm slides on the stem as the diaphragm moves in response to changing pressure differentials, but it is quite difficult to regulate the friction between the bearing and stem to a uniformly low value, and correspondingly difficult to calibrate the diaphragm sensitivity and maintain a satisfactory, controlled sensitivity of the diaphragm to pressure differential changes.

One of the objects of the present invention is to provide a regulator of the diaphragm type referred to above, wherein the diaphragm maintains a more controlled responsiveness to the two pressures on its one side, regardless of the degree of opening. A further object is to provide a diaphragm wherein equal pressure responsive effectiveness of respective central and peripheral areas of one face thereof may be attained by proportioning said areas so as to be substantially equal in radial extent. A further object is to provide a regulator wherein the need for a slidable connection between a diaphragm and an air bleed stem passing through the center thereof, is obviated.

Additional objects are to eliminate undesirable flutter in the center of the diaphragm; to eliminate the difficulty of calibrating diaphragm sensitivity; and to provide for maximum diaphragm movement in the zone thereof which engages the valve seat. Specifically, the invention aims to provide a regulator valve wherein the diaphragm is fixedly mounted not only at its periphery but also at the center thereof, and wherein the area of maximum freedom of movement is near but inside the annular area which contacts the valve seat.

Another object is to provide a regulator of the general type outlined above, wherein maximum simplicity of construction is attained. To this end, the invention may utilize pilot units which are disposed in direct communication with the control chamber in an annular array around the central axis of the regulator with the pilot valves arranged in positions intermediate the control chamber and the bellows chamber.

Another object is to provide a regulator which does not require a constant leakage of air through the control chamber when in the closed position. In the common type of regulator mentioned above, the pressure in the control chamber is regulated by varying the rate of inflow into the chamber from the cabin, while air bleeds out of the control chamber at a constant rate. Thus, even though the regulator is fully closed, air will constantly leak out of the control chamber, requiring a corresponding inflow in order to maintain the closing pressure against the regulator valve. In many installations such a leakage is objectionable, and a substantially no-leakage operation is required for the closed position. The invention aims to provide a regulator than can maintain a closed position without substantial leakage through the control chamber.

Other objects will become apparent in the ensuing specifications and appended drawings in which:

Fig. 3 is a side view of a modified form of the invention;

Fig. 4 is a plan view thereof, with parts broken away and shown in section;

Fig. 5 is an axial sectional view thereof; and

Fig. 6 is a detail sectional view thereof on the line 6—6 of Fig. 4.

Figure 2:
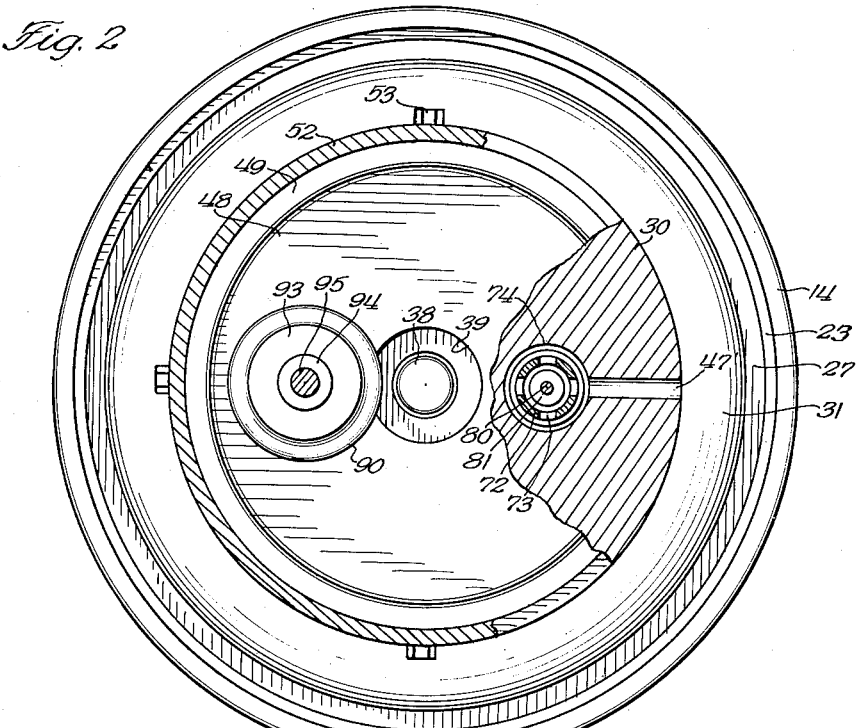
Fig. 2 is a radial sectional view thereof taken partially through the bellows chamber and partially in the plane of the pilot valve unit, as indicated by the line 2—2 of Fig. 1.

Referring now to the drawings in detail, I have shown therein as an example of one form in which the invention may be embodied, a regulator valve embodying generally a housing A, which is mounted externally (on the ambient side) of a wall section B of a pressurized chamber (cabin) of an aircraft fuselage, and which encloses the combined diaphragm and valve C and a series of control pilots which may include an isobaric control D and a differential pressure control E.

The invention contemplates mounting the regulator in an unpressurized chamber within an aircraft fuselage (rather than locating the regulator in the atmosphere outside the fuselage, which would not only create an undesirable increase in drag but would subject the discharge ports of the regulator to pressure variations applied by the slipstream to which the regulator would thus be subjected). For example, the regulator of my invention can be mounted in a nose compartment which commonly has apertures connecting it to atmosphere, or may be mounted in an external recess in the pressurized cabin, with the streamlined skin surface of the fuselage being continued across the recess by a door which can be opened to give direct access to the regulator from the exterior of the airplane, for servicing.

The housing

Housing A is constructed with relative simplicity in three sections including a base section, indicated generally at 5, an intermediate section 6 and a bellows chamber dome 7. Base section 5 includes a mounting flange 10 for attachment to cabin wall B as by means of cap screws 11, a throat 12 which communicates with an outlet port 13 in cabin wall B, and a mounting rim (flange) 14 which is connected to throat 12 by a series of arcuate webs 15. Webs 15 are circumferentially separated to define discharge ports 16. Rim 14 and webs 15 conjointly constitute a bowl-shaped structure which is apertured to provide the discharge ports 16, the bottom of such bowl shaped structure being integrally joined to the outer wall of throat 12. Throat 12 has an outer portion projecting beyond webs 15 to provide a valve seat 20. Adjacent to discharge ports 16, rim 14 is provided with a toroidal groove 21 providing a seat for the periphery of diaphragm C. At its outer end, rim 14 has an internal groove 22 which receives a snap ring (split spring ring) 23 projecting radially inwardly.

Intermediate housing section 6 comprises a rim portion 25 having a cylindrical outer wall which is loosely fitted to the cylindrical inner wall of mounting rim 14. Rim portion 25 also has a peripheral wall 26 which is arched in cross section to extend the toroidal contour of groove 21 sufficiently to securely hold the rim of diaphragm C captive. Rim portion 25 also has an outward, axially facing shoulder 27 which is abutted by snap-ring 23 for securely holding intermediate section 6 in an assembled position in which wall 26 engages the rim of diaphragm C.

Intermediate housing section 6 further includes a body portion 30 which is generally in the form of a flat annular ring and which is joined to rim 25 by a dished bridging portion 31. Body 30, bridging portion 31 and rim 25 have a common inner wall 32 of toroidal shape, arched axially outwardly and radially inwardly from the periphery of diaphragm C and constituting the outer wall of a control chamber F.

Intermediate housing section 6 further includes a central sleeve 33, integral with body 30, projecting axially toward throat 12, and terminating short of the plane of valve seat 20. Sleeve 33 has a reduced tubular end portion 34 and an offset shoulder between its main body portion and reduced end portion 34, in which is formed a toroidal groove 35 for receiving the inner marginal portion of diaphragm C. Recessed in the inner wall of tubular end portion 34 is an annular groove which receives a snap-ring 36. Projecting radially inwardly from this inner wall, at the junction thereof with the inner wall of sleeve body 33, is a flange 37. An air filtering cup 38 of air pervious material has a rim flange which is mounted between flange 37 and snap ring 36 and a body which projects into the passage 39 defined by the inner wall of body 33. Filter 38 thus provides a filtering connection between the passage 40 (which is defined within reduced tubular end 34) and passage 39 through which cabin pressure from the cabin atmosphere (which is indicated by the word "Cabin") may communicate directly with the bellows chamber G through throat 12 and passages 40 and 39.

Adjacent its inner end, tubular end portion 34 has an external groove in which is seated a snap ring 41 which secures a washer 42 cooperating with groove 35 to secure the inner portion of diaphragm C.

Extending through one side of sleeve body 33 is a restricted bleed orifice 45, through which air may flow from the high pressure bellows chamber G into the intermediate pressure control chamber F.

In the annular body 30 of intermediate housing section 6 there is a series of cylindrical pilot valve mounting bores 46 which are in open communication with control chamber F. Communicating with these bores are a series of pilot valve discharge ports 47, 47' which extend radially through body 30 to communicate directly with ambient pressure, indicated by the word "Ambient." It will be understood that such ambient pressure may be the actual direct pressure of ambient atmosphere or may be the pressure within an external fuselage compartment, open to atmosphere or unpressurized, but deviating slightly in pressure from actual atmospheric pressure.

Housing body 30 has a flat outer end face 48, normal to the major axis of the regulator, and a flange 49 projecting axially therefrom and recessed inwardly from the cylindrical periphery thereof. Flange 49 has a groove 50 in which is seated a packing ring 51.

Bellows chamber hood 7 is bowl shaped, including a cylindrical lateral wall 52 which receives flange 49 and is attached thereto as by cap screws 53; and including a flat head 54 provided with apertures 55 in which the control units of pilots D and E are mounted.

An annular outlet chamber 56 is defined between web members 15 and the outer face of the peripheral portion of the diaphragm C.

*The diaphragm.—Valve*

Diaphragm C consists in a main body portion in the form of a ring of relatively thin, highly flexible sheet of woven fabric, impregnated with a material, such as soft rubber, synthetic soft rubber or a synthetic resin plastic material having comparable qualities of toughness and flexibility; together with a beaded rim 60 at its periphery and an annular bead 61 at its inner margin. Bead 60 is securely clamped between peripheral wall 26 of housing section 6 and groove 21 of section 5, and functions both as an anchoring means to secure the periphery of the diaphragm and as a gasket to establish a seal between the two housing sections. Inner marginal bead 61 is securely clamped between groove 35 of sleeve 33 and washer 42 and functions both to anchor the center of the diaphragm in a fixed position and to establish a seal between the diaphragm and the central sleeve 33 of housing section 6. It will now be apparent that the diaphragm completely seals off control chamber F from cabin pressure in throat 12 and ambient pressure in the outlet chamber 56.

The body of the diaphragm comprises a peripheral portion 62 and a central portion which is of reversed curvature, the innermost part 63 thereof being dished with its concave side facing throat 12 and the outer portion 64 thereof being reversely dished with a curvature constituting a continuation of the curvature of peripheral portion 62. Areas 62 and 64 are divided by a circular area of engagement with valve seat 20. On the outer face of the diaphragm, generally opposite this area of valve seat engagement, but with the inner margin thereof at substantially the radius of the outer margin of valve seat 20, is an annular ridge 65 the inner margin of which provides a shoulder which is disposed substantially at the same radius as the outer margin of seat 20. Within this shoulder is contained one end of a frustro-conical spring 66 (directly opposed to seat 20) the other end of spring 66 being piloted around a shoulder flange 67 on housing body 30 at the inner extremity of arched wall 32.

It may now be noted that the crown of arched wall 32 is nearly opposite the valve seat 20, though at a somewhat smaller radius. The deepest portion of diaphragm C is thus disposed somewhat outwardly of the crown of wall 32. The diaphragm C, for the position of maximum valve opening, (shown in dotted lines) may assume a curvature reversed from that of its closed position shown in full lines, with spring 66 substantially flattened against arched wall 32. At this point it may be noted that spring 66 is a very light spring, applying only sufficient pressure against the diaphragm C to support that portion of the weight thereof which is not supported by the anchored beads 60 and 61 plus the slight resilient force of the diaphragm tending to resume its normal contour which is that of the closed position shown in full line. The spring load may be even lighter than that required to support a diaphragm of the conventional type having a freely movable central area, since the added support of the fixedly anchored central portion of diaphragm C reduces the amount of support required from the spring. It is to be further understood that the spring could be dispensed with in installations where the valve is mounted upright, with dome 7 facing upwardly as indicated in the drawing, but for mounting in an inverted position, the spring 66 must be capable of supporting the dead weight of the diaphragm when no air pressure differentials are acting thereon.

By shaping the control chamber so that the valve seating area thereof intermediate its outer and inner margins is provided with maximum room for travel, maximum efficiency of operation of the diaphragm to provide maximum area in the full-open valve position, is provided for.

As the result of anchoring the diaphragm both at its outer and inner margins, the central areas 63, 64 may be equal to the peripheral area 62, although the radial width thereof will of course be greater, as determined by the relationship between radius and area in which area is directly proportional to the square of radius. To meet this relationship, the crown of wall 32 is disposed somewhat inwardly of valve seat 20, substantially midway between the radii of the outer and inner beads 60 and 61.

The annular zone of most freely responsive area of the diaphragm (i. e., the annular zone midway between its inner and outer margins) is likewise disposed inwardly of valve seat 12 and is directly opposed to the crown of wall 32, whereby it may have maximum amplitude of travel in valve opening and closing movements. This mid-zone of the diaphragm constitutes a portion of the central area which is acted upon by cabin pressure in throat 12. This provides for maximum response to any slight increase of cabin pressure over that value which would establish a balanced position.

By anchoring the center of the diaphragm it becomes possible to equalize the area of the peripheral area 62 of the diaphragm with the area thereof inwardly of the valve seat 20. Accordingly, peripheral area 62 equals inner area 63, 64.

Anchoring the center of the diaphragm largely eliminates diaphragm flutter.

*The control pilots*

The pilot valve units may be substantially identical, including valve cages 70, 70' each having a mounting flange 71 which may be secured, as by the indicated screws, to the outer face 48 of housing body 30; and each including a cylindrical body 72 having lateral ports 73 communicating with an annular chamber 74 which is defined between the outer wall of the annular body 72 and the wall of mounting bore 46 and sealed at the axial extremities thereof by spaced packing rings 75. Chambers 74 communicate with respective ports 47, 47'. One end of annular body 72 is reduced to provide a valve seat 78 and the other end is closed by a plug 79 having a central, axial bore in which is slidably mounted the outer stem 80 of a poppet valve 81. Valve 81 cooperates with seat 78 to control flow from a central passage 82 in the reduced end portion of cage body 72, past the valve seat 78 into the central valve chamber 83 of the valve unit. From chamber 83 the air may escape through port 72 into annular chamber 74 and thence through radial discharge ports 47' in housing body 30. The reduced inner end portion of valve body 72 has a head 85 provided with an aperture in which is slidably mounted the inner stem 82 of valve poppet 81. A light coil spring 87 is engaged under compression between head 85 and valve poppet 81, tending to unseat the poppet. Ports 88 establish direct communication between control chamber F and passage 82, so that valve 81 may control the flow of air from chamber F to discharge port 47 or 47' as the case may be. The inner end portions of the valve units may project directly into control chamber F as shown, but are positioned to clear the diaphragm C in its full open position.

The control units D, E are broadly similar, including a bellows 90 for unit D and a bellows 90' for unit E. Each of the bellows has an inner end closed by a head 91 provided with a flat faced boss 92 for engagement against the outer end of a respective valve stem 80. Each of the bellows has at its outer end a head 93 to which is secured a mounting flange 94 at the inner end of a mounting stalk 95 (for pilot D) 95' (for pilot E). Each of mounting stalks 95, 95' has a threaded outer end portion 96 which is adjustably mounted within a nut 97, mounted within a circular opening in dome head 54. The outer end of each threaded stalk portion 96 may be provided with a squared or hexed socket 98 to receive a wrench for rotating the respective valve unit for the purpose of adjusting it to a selected position.

Each control unit may include a coil spring 100 for establishing a pre-determined expansion load within the bellows by engagement under compression between heads 91 and 93. Bellows D, being an aneroid, is a sealed, evacuated bellows responsive directly to changes in cabin pressure existing in the bellows chamber G. Stalk 95 may be solid. Bellows 90', being a differential pressure responsive bellows, is responsive externally to the cabin pressure in bellows chamber G and, internally, is subjected to ambient pressure communicated thereto through an axial passage 101 in stalk 95' which is tubular.

Operation

Control bellows 90, 90' operate by extension into engagement with the respective stems 80. When the airplane is standing on the ground (or in case it is flying at a low altitude without the cabin superchargers being in operation) pressure differentials will be substantially equalized on both sides of diaphragm C and spring 66 will maintain the diaphragm closed. When the cabin supercharger is operated to pump air under pressure into the cabin, the cabin pressure will initially build up to a slight differential over ambient pressure, just sufficient to overcome the load of spring 66 and to flex the diaphragm C to its fully open position. The isobaric pilot D at this time will be fully open, the bellows 90 being collapsed by the relatively high pressure in chamber G, and the boss 92 being withdrawn completely out of contact with valve stem 80. Accordingly, air will flow freely out of the cabin, equalizing the pressure therein with that of ambient atmosphere.

As the airplane gradually ascends toward the isobaric ceiling, the pressure within the cabin will gradually drop owing to the continued outflow through discharge port 16, and the pressure in bellows chamber G will correspondingly drop, allowing bellows 90 of pilot D to gradually expand. The pressure in control chamber F will also drop due to the outflow through the valve of isobaric pilot D and through port 47.

Throughout this stage of operation, bellows 90' is expanded by the pressure of spring 100, there being no air pressure differential. Its valve will therefore be closed.

As the ceiling is approached, the head of aneroid 90 will contact stem 80 of pilot D and commence to close the pilot against the resistance of its spring 87. Thus the pressure across pilot D will be gradually restricted, restricting the outflow and causing pressure in control chamber F to gradually build up toward cabin pressure. At the isobaric ceiling (e. g. 8000 feet or 10,000 feet) altitude the pressure in chamber F will reach a value intermediate between that of cabin and ambient pressure, whereat the combination of high pressure acting against the central areas 63, 64 of the diaphragm and low ambient pressure acting against the peripheral portion 62 of the diaphragm, will be balanced by the intermediate pressure of chamber F acting against the entire outer area of the diaphragm.

Thereafter, isobaric pilot D will remain nearly closed, operating with a modulating action maintaining the cabin pressure at a fixed value until the plane arrives at an elevation where the continued dropping of ambient pressure has built up a differential of cabin pressure over ambient pressure whereas the bellows 90' of pilot E will have contracted to the point of allowing the poppet 81 of pilot E to leave its seat. When the cabin-ambient differential is at the pre-determined value, pilot E will operate with a modulating action to control the escape of air from control chamber F through pilot E and escape port 47' to maintain a controlled pressure in chamber F such that the balancing thereof against the cabin and ambient pressures acting against the areas 62, 63 and 64 of the diaphragm will maintain a constant differential of cabin pressure over ambient pressure.

*The preferred form of the invention as disclosed in Figs. 3–5*

Figure 1:
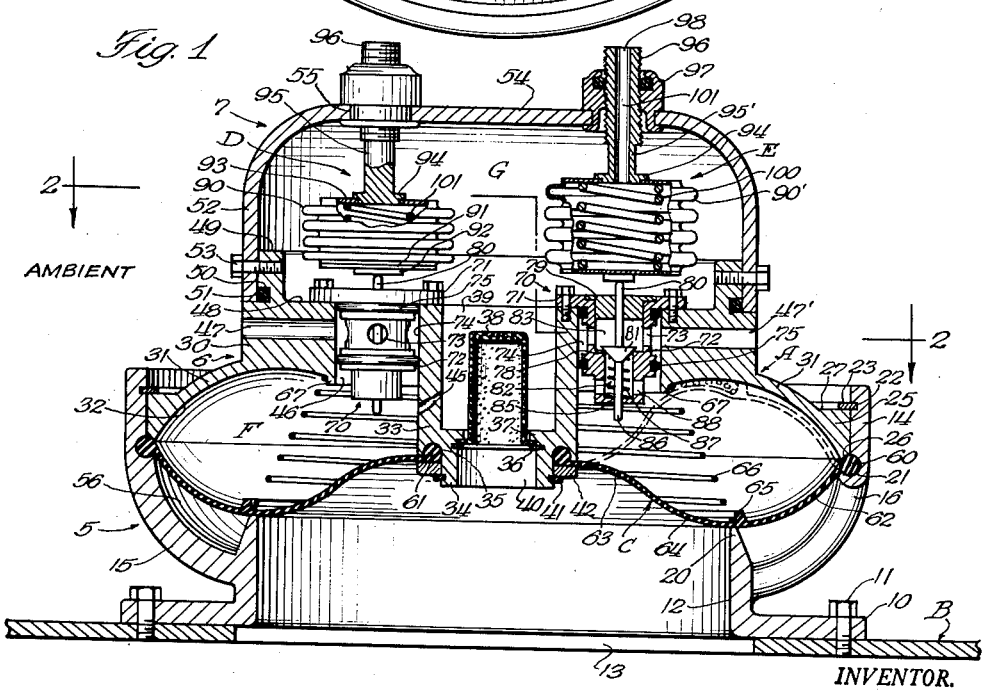
Fig. 1 is an axial sectional view of the regulator taken in a plane intersecting two of the pilot valve assemblies.

Figs. 3–5 disclose the invention in a modified form of regulator differing from the above described regulator primarily in having the isobaric and differential pilots D' and E' respectively, arranged with their major axes lying in a plane normal to the axis of the regulator throat and diaphragm. For a majority of installations, this form is preferred because of its greater axial compactness, and accordingly it is designated as the preferred form of the invention. The preferred regulator embodies substantially all of the features of the previously described regulator. Parts which are identical or substantially identical are designated by the same reference numerals as in Figs. 1, 2. Detailed description of these parts is not here repeated. Corresponding reference numerals, with the suffix "a," added, are used to designate parts which correspond to parts of the previously described regulator but are somewhat modified in shape or position without departing from the invention. Additional reference numerals are used to designate additional parts.

Referring briefly to the modified parts, in the housing A', base section 5a has a mounting flange 10a which is cylindrical and internally threaded for threaded attachment to a threaded cabin outlet conduit. Regulator outlets 16a of maximum circumferential extent are defined between relatively narrow webs 15a which extend outwardly from regulator throat 12a to mounting rim 14a. Intermediate body section 6a is of flat dished form and includes a flat body portion 30a, a frusto-conical rim portion 31a having a peripheral flange 25a mounted in base rim 14a, and a central sleeve 33a; and has a flat inner wall 32a defining the crown of control chamber F' the opposite side of which is defined by diaphragm C'. The outer bead 66a of diaphragm C' is secured between flange 25a and a seat 21a in rim 14a and the inner bead 61a is confined between the end of sleeve 33a and an annular seat 42a formed on the head of a tubular fitting 34a which is threaded into the axial passage 39a of sleeve 33a, fitting 34a having a passage 40a communicating with passage 39a and a flat filter 38a being mounted in fitting 34a and secured by a snap ring 36a in the head of the fitting.

Diaphragm C' includes a peripheral portion 62a lying outwardly of valve seat 20a and an inner portion 63a, of frustro-conical form. Diaphragm spring 66a has its inner end captive beneath an annular flange 65a integral with the diaphragm, and its outer, smaller end piloted around sleeve 33a and engaged against the inner portion of wall 32a.

Projecting outwardly from the flat crown portion 30a of intermediate housing section 6a is a rectangular body portion 105 which extends diametrically substantially at the regulator axis, and has at one side thereof a flat wall 48a lying in a plane parallel to the regulator axis. Casing 7a is sealed to wall 48a by a gasket 51a seated in an annular groove 50a therein. Bellows chamber G' is defined between wall 48a and bellows casing 7a. Body 105 has therein a pair of pilot valve chambers 46a the axes of which are spaced equally on opposite sides of the regulator axis and lie in a plane normal thereto. Attached to wall 48a is a bellows cover 7a including rim 52a and a head 54a which has a pair of bosses 55a coaxial with the pilot valve chambers 46a. The pilot valve units D and E are mounted in body 105 and bellows casing 7a respectively, with the valve assemblies mounted on wall 48a and extending into chambers 46a, and with the respective bellows stems mounted in bosses 55a. Attached to the threaded outer end 96 of differential bellows stem 95', in addition to the lock nut 97, is a gland nut 99 having an aperture which may either communicate directly with ambient atmosphere or may receive a connecting tube sealed to stem 95' by nut 99. A similar nut may be optionally used on stem 95 of pilot D.

Bellows casing 7a is secured to body 105 by cap screws 63a extended through flange 49a of body 105 and threaded into ears 106 at the ends of bellows casing 7a.

Pilot valve units have their annular outlet chambers 74 in communication with atmosphere through a common port 47a extending in body 105 between the respective annular outlet ports 74, and a central outlet port 107 which is located substantially at the regulator axis and is covered by a screen 108 mounted therein.

*Ground test valve*

For testing purposes, the regulator of Figs. 3–5 includes a ground test valve H—a three position valve having a neutral position in which both pilots are operative, and which may be actuated so as to (a) cut out the isobaric pilot; (b) cut out both isobaric and differential pilots.

Valve unit H has a valve chamber 110 defined within a boss 111 on intermediate housing head 30a. A valve seat 112, integral with head 30a, encircles a port 113 extending between control chamber F' and chamber 110. The valve H is of the pet-cock type, including a double valve head 114 having a threaded stem 115 which is threaded into a mounting sleeve 116. Sleeve 116 has a mounting flange 117 which is mounted upon a flat outer face of boss 111 and covers chamber 110, being sealed by an O-ring 118. At its inner end, sleeve 116 has an integral valve seat 119 which is axially opposed to valve seat 112. Valve head 114 has oppositely facing seal rings 120, 121 adapted to engage respectively the valve seats 112 and 119. Attached to the outer end of stem 115 is an actuator handle 122.

Valve chamber 110 is connected to valve chamber 46a of isobaric pilot D as follows: in a duct 123, integral and extending radially from sleeve 116, is an L-shaped passage the outer end portion 123' of which turns downwardly toward head 30a, and communicates with a port 124 in the outer face of boss 111. Port 124 constitutes the end of a U-shaped passage 125 in boss 111, the other end of the passage being a port 126 which opens upwardly into chamber 46a of pilot D'. When the test valve H is in the neutral position, air may escape from control chamber F' past the valve of pilot D' by passing through port 113 into chamber 110, thence upwardly into sleeve 116, thence through radial duct 123, thence downwardly through the port 123' at the outer end thereof and through port 124 into passage 125 in boss 111, thence through port 126 into chamber 46a of pilot D, thence through the valve of pilot D, and thence through outlet ports 73, 74a and 107 to ambient.

When seal ring 121 of test valve H is seated against valve seat 119, thus flow passage for release of air from control chamber F' past isobaric pilot D' is cut off and the pilot D is thereby rendered inoperative. Accordingly, it becomes possible to test the differential pilot while the airplane is on the ground, the regulator responding solely to the differential control when air is pumped into the cabin.

The test valve chamber 110 is connected to the valve chamber 46a of differential pilot E by means of an L-shaped passage 127 which extends from chamber 110 directly toward this chamber 46a and terminates in a port 128 opening upwardly into this chamber 46a. Passage 127 may constitute one end of a bore extending all the way through boss 11, the outer end thereof being closed by a plug 129.

When the test valve is in its inward position, with seal ring 120 engaging seat 112, port 113 is closed off and thus both of the pilots D and E are shut off from the control chamber F' and both are therefore rendered inoperative. Under such conditions, the regulator will remain closed at all cabin pressures up to the limit where the pressure release safety valves (which are commonly incorporated in an airplane pressurizing system, as a safety measure) will open, and thus such safety valves may be tested.

I claim:

1. In a control system for a pressurized aircraft cabin having an air outlet, a cabin pressure regulator mounted over said outlet on the ambient side of the cabin, said regulator comprising: an outlet throat extending outwardly from said cabin outlet and having an annular valve seat at its outer end; a regulator housing disposed outwardly of said throat, said housing including a rim portion disposed radially outwardly of said seat and means joining said rim portion to said throat and defining an outlet for said regulator, said housing further including an annular intermediate portion having a toroidal wall projecting radially inwardly from said rim with its crown in axially opposed relation to said valve seat, a central housing portion disposed radially inwardly of said valve seat and having a passage at the axis of the regulator, and means defining, axially outwardly of said annular intermediate housing portion, a bellows chamber communicating with said throat through said passage; a diaphragm secured at its periphery and at its center, respectively, in substantially a common plane normal to the axis of said throat, to said rim and said central housing portion respectively, a control chamber being defined between the outer face of said diaphragm and said toroidal wall, said housing having a fixed bleed passage extending from said bellows chamber to said control chamber; said valve seat being axially spaced cabinward from said plane and the crown of said toroidal wall being axially spaced outwardly from said common plane respectively, whereby the intermediate portion of said diaphragm may have flexing movement on both sides of said plane, from a closed position seated against said valve seat, wherein cabin pressure in said throat is exerted directly against the central area of the cabinward face of said diaphragm and ambient pressure is exerted directly against the peripheral area of said cabinward face, while control pressure is exerted against the entire outer face of the diaphragm in said control chamber, to an open position adjacent said toroidal wall, in which said throat is placed in direct communication with said regulator outlet for outflow radially outwardly across said valve seat; a pair of control pilots each including a valve unit having an inlet side communicating directly with said control chamber and a bellows disposed in said bellows chamber, one of said bellows being an aneroid responding to changes of cabin pressure in said bellows chamber and the other being a differential pressure bellows externally subjected to said cabin pressure in the bellows chamber and internally connected to ambient pressure through said housing so as to respond to the differential between cabin and ambient pressure; said housing having a pair of pilot outlet passages each extending in said housing from the outlet side of a respective valve unit to the exterior of said housing for direct communication with ambient pressure; said bellows being associated with said valve units for operating the same to modulate the pressure in said control chamber so as to maintain equilibrium in said diaphragm in a manner to control cabin pressure at a relatively fixed value for intermediate altitude operation of the airplane and at a substantially fixed differential of cabin over ambient pressure at higher altitudes.

2. A regulator as defined in claim 1, wherein said valve seat is located radially outwardly of the annular area of maximum axial movement of said diaphragm lying midway between its periphery and inner margin, and wherein the crown of said toroidal wall is correspondingly disposed inwardly of the radius of said valve seat.

3. A regulator as defined in claim 13 wherein said pilot units are disposed on axes parallel to the regulator axis and radially outwardly of said central housing portion but adjacent the same.

4. A regulator as defined in claim 13, wherein said central housing portion comprises a sleeve projecting toward said throat and having a reduced end portion and a shouldered seat at the base of said reduced end portion; and including a washer encircling said reduced end portion and cooperating with said shouldered seat to clamp the inner margin of said diaphragm to said sleeve.

5. In a control system for a pressurized aircraft cabin having an air outlet, a cabin pressure regulator mounted over said outlet on the ambient side of the cabin, said regulator comprising: an outlet throat extending outwardly from said cabin outlet and having an annular valve seat at its outer end; a regulator housing disposed outwardly of said throat, said housing including a rim portion disposed radially outwardly of said seat, and means joining said rim portion to said throat and defining an outlet for said regulator, said housing further including an annular intermediate portion, a central portion having a through passage disposed at the axis of the regulator, and means defining, axially outwardly of said intermediate portion, a bellows chamber communicating with said throat through said passage; a diaphragm secured to said rim and said central housing portion at its periphery and at its center, respectively, in substantially a common plane normal to the axis of said throat and spaced axially outwardly from the plane of said valve seat, a control chamber being defined between the outer face of said diaphragm and said intermediate housing portion, said central housing portion having a fixed bleed passage extending from said bellows chamber to said control chamber; said diaphragm having an annular zone intermediate its outer and inner margins, adapted to have flexing movement on both sides of said plane, from a closed position seated against said valve seat, wherein cabin pressure in said throat is exerted directly against the central area of the cabinward face of said diaphragm and ambient pressure is exerted directly against the peripheral area of said cabinward face, while control pressure is exerted against the entire outer face of the diaphragm in said control chamber, to an open position adjacent said intermediate housing portion, in which said throat is placed in direct communication with said regulator outlet for outflow radially outwardly across said valve seat; a pair of control pilots each including a valve unit mounted in said intermediate housing portion and having an inlet side communicating with said control chamber and a bellows disposed in said bellows chamber and engageable with a respective pilot valve unit for actuating the same, one of said bellows being an aneroid responding to changes of cabin pressure in said bellows chamber and the other being a differential pressure bellows externally subjected to said cabin pressure in the bellows chamber and internally connected to ambient pressure through said housing so as to respond to the differential between cabin and ambient pressure; said housing having a pair of pilot outlet passages each extending directly from the outlet side of a respective pilot valve unit directly to the exterior of said housing for communication with ambient pressure.

6. In a control system for a pressurized aircraft cabin having an air outlet, a cabin pressure regulator mounted over said outlet on the ambient side of the cabin, said regulator comprising: an outlet throat extending outwardly from said cabin outlet and having an annular valve seat at its outer end; a regulator housing disposed outwardly of said throat, said housing including a rim portion disposed radially outwardly of said seat and means joining said rim portion to said throat and defining an outlet for said regulator, said housing further including an annular intermediate portion, a central portion having a through passage disposed at the axis of the regulator, and a bellows cover mounted on said intermediate housing portion axially outwardly thereof and defining a bellows chamber communicating with said throat through said passage; a diaphragm secured to said rim and said central housing portion at its periphery and at its center, respectively, in substantially a common plane normal to the axis of said throat and spaced axially outwardly from the plane of said valve seat, a control chamber being defined between the outer face of said diaphragm and said intermediate housing portion, said central housing portion having a fixed bleed passage extending from said bellows chamber to said control chamber; said diaphragm having an annular zone intermediate its outer and inner margins, adapted to have flexing movement on both sides of said plane, from a closed position seated against said valve seat, wherein said cabin pressure in said throat is exerted directly against the central area of the cabinward face of said diaphragm and ambient pressure is exerted directly against the peripheral area of said cabinward face, while control pressure is exerted against the entire outer face of the diaphragm in said control chamber, to an open position adjacent said intermediate housing portion, in which said thoat is placed in direct communication with said regulator outlet for outflow radially outwardly across said valve seat; a pair of control pilots each including a valve unit mounted in said intermediate housing portion and having an inlet side communicating with said control chamber and a bellows disposed in said bellows chamber, each bellows having a fixed end mounted on said bellows cover and a movable end engageable with a respective pilot valve unit for actuating the same, one of said bellows being an aneroid responding to changes of cabin pressure in said bellows chamber and the other being a differential pressure bellows externally subjected to said cabin pressure in the bellows chamber and internally connected to ambient pressure through said housing so as to respond to the differential between cabin and ambient pressure; said housing having a pair of pilot outlet passages each extending directly from the outlet side of a respective pilot valve unit directly to the exterior of said housing for communication with ambient pressure.

7. In a control system for a pressurized aircraft cabin having an air outlet, a pressure regulator mounted over said outlet on the ambient side of the cabin, said regulator comprising: an outlet throat extending outwardly from said cabin outlet and having an annular valve seat at its outer end; an annular diaphragm; a housing including a rim to which the periphery of said diaphragm is secured, including a central portion to which the inner margin of said diaphragm is secured, including an intermediate portion having an inner wall cooperating with the outer side of said diaphragm to define a control chamber, and including a bellows cover mounted on said intermediate housing portion on the outer side thereof and cooperating therewith to define a bellows chamber; said periphery and inner margin of the diaghargm being disposed substantially in a common plane located inwardly of said inner wall and outwardly of the plane of said valve seat, said diaphragm having an annular zone, intermediate said periphery and inner margin, adapted for flexing movement between a closed position seated against said valve seat, wherein cabin pressure in said throat is exerted directly against the central area of the cabinward face of said diaphragm and ambient pressure is exerted directly against the peripheral area of said cabinward face, while control pressure is exerted against the entire outer face of the diaphragm in said control chamber, to an open position adjacent said inner wall, in which said throat is placed in direct communication with said regulator outlet for outflow radially outwardly across said valve seat; said central housing portion having a through passage, providing unrestricted communication between said throat and said bellows chamber through the center of said diaphragm, for establishing cabin pressure in said bellows chamber, and having a fixed, restricted bleed passage for restricted flow of air from said through passage into said control chamber; said intermediate housing portion having therein a plurality of pilot valve chambers; control pilots each including a pilot valve unit disposed in a respective valve chamber and mounted on an outer wall of said intermediate housing portion, and each including a bellows disposed in said bellows chamber, having a fixed end mounted on said bellows cover and having a movable end engageable with a respective valve unit for actuating the same; said housing having passage means for flow of air from said control chamber to said valve chambers at the inlet sides of said pilot valve units, and having other passage means for escape of air from said valve chambers at the outlet sides of said pilot valve units, directly to ambient pressure outside the housing; one of said bellows being an aneroid responding to changes of cabin pressure in said bellows chamber and the other being a differential bellows externally subjected to cabin pressure in said bellows chamber and internally connected to ambient pressure through said housing so as to respond to changes in the differential of cabin pressure over ambient pressure.

8. A control system as defined in claim 7, wherein said pilot valve chambers consist in cylindrical bores extending axially through said intermediate housing portion from said bellows chamber to the outer side of said intermediate housing portion; wherein said outer side of said intermediate housing portion is defined by a flat outer wall normal to the regulator axis and said intermediate housing portion has a peripheral flange projecting axially outwardly from said flat wall; wherein said bellows cover is of dome shape, having a cylindrical lateral wall connected to said peripheral flange and having a head axially opposed to said flat outer wall; and wherein said bellows have, at their fixed ends, stems which are adjustably mounted in said head, the stem of the differential bellows being tubular for connecting the interior of the differential bellows to ambient pressure.

9. A regulator as defined in claim 7, wherein said intermediate housing portion includes an annular part and a rearwardly projecting part, extending substantially diametrically of the regulator axis and having a mounting wall disposed normal to said annular part and parallel and adjacent to the regulator axis, said pilot valve chambers being formed in said rearwardly projecting part; and wherein said bellows cover is oblong and is attached to said mounting wall with its longitudinal axis extending parallel to the plane of said annular part; and wherein said control pilots are mounted on axes parallel to the plane of said annular part and normal to the plane of said mounting wall and are spaced on opposite sides of the regulator axis.

10. A regulator as defined in claim 14, including a three position ground test valve operable, in one limit position, to close off communication between the control chamber and both of said pilot valves, operable in another limit position to close off communication between the control chamber and the valve of the isobaric control pilot, and operable, in a neutral position, to establish communication between said control chamber and both of said pilot valves.

11. A regulator as defined in claim 7, wherein said intermediate housing portion includes an annular part disposed substantially in a plane normal in the regulator axis and a rearwardly projecting part disposed substantially along the diameter of the regulator axis and having a mounting wall disposed in a plane parallel to the regulator axis and normal to said plane of said annular part, said bellows cover being mounted to said mounting wall on one side of the regulator axis; said regulator further including a ground test valve disposed on the opposite side of the regulator axis from said bellows cover, said ground test valve including a boss formed integrally with said annular part of the intermediate housing portion and projecting outwardly therefrom and providing a cylindrical valve chamber having an axis parallel to the regulator axis, said annular housing part having an annular portion projecting radially inwardly from the wall of said cylindrical valve chamber, defining a port connecting said control chamber to said cylindrical valve chamber and having an axially outwardly facing inner valve seat, a valve mounting sleeve secured to the outer end of said boss, covering said cylindrical valve chamber and having an outer valve seat axially opposed to said inner valve seat, a valve element having a stem threaded into said sleeve and having, within said cylindrical valve chamber, a head provided with dual valve faces engageable with said axially opposed valve seats, and an actuator handle attached to the outer end of said valve stem, said sleeve having a radial duct for establishing communication between said cylindrical valve chamber and the valve chamber of the differential pilot, said boss having a duct extending from said cylindrical valve chamber to the valve chamber of said differential pilot, said valve element being adapted, when closed against said inner valve seat, to close off communication between said bellows chamber and both of said pilots so as to render them both inoperative, when engaged against said outer valve seat to close off said radial duct whereby to render only said isobaric pilot inoperative, and when in a neutral position intermediate said axially opposed valve seats, providing for communication between the bellows chamber and both of the pilot valve chambers so as to render both pilots operative.

12. In a control system for a pressurized aircraft cabin having an air outlet, a pressure regulator mounted over said outlet on the ambient side of the cabin, said regulator comprising: an outlet throat extending outwardly from said cabin outlet and having an annular valve seat at its outer end; an annular diaphragm; a housing including a rim to which the periphery of said diaphragm is secured, including a central portion to which the inner margin of said diaphragm is secured, including an intermediate portion having an inner wall cooperating with the outer side of said diaphragm to define a control chamber of shallow axial depth substantially restricted to a full range of diaphragm movement, and means defining a bellows chamber, said central housing portion being disposed between said throat and bellows chamber, having a passage establishing unrestricted communication between said throat and said bellows chamber through the center of said diaphragm for establishing cabin pressure in said bellows chamber, and having a fixed, restricted bleed for restricted flow of air from said passage into said control chamber; said periphery and inner margin of the diaphragm being disposed substantially in a common plane located inwardly of said inner wall and outwardly of the plane of said valve seat, said diaphragm having an annular zone, intermediate said periphery and inner margin, adapted for flexing movement between a closed position seated against said valve seat, wherein cabin pressure in said throat is exerted directly against the central area of the cabinward face of said diaphragm and ambient pressure is exerted directly against the peripheral area of said cabinward face, while control pressure is exerted against the entire outer face of the diaphragm in said control chamber, to an open position adjacent said inner wall, in which said throat is placed in direct communication with said regulator outlet for outflow radially outwardly across said valve seat; a pair of control pilots each including a valve unit having an inlet side communicating directly with said control chamber and a bellows disposed in said bellows chamber, one of said bellows being an aneroid responding to changes of cabin pressure in said bellows chamber and the other being a differential pressure bellows externally subjected to said cabin pressure in the bellows chamber and internally connected to ambient pressure through said housing so as to respond to the differential between cabin and ambient pressure; said housing having passage means for escape of air from the outlet sides of the respective pilot valve units directly to ambient pressure outside the housing; said bellows being associated with said valve units for operating the same to modulate the pressure in said control chamber so as to maintain equilibrium in said diaphragm in a manner to control cabin pressure at a relatively fixed value for intermediate altitude operation of the airplane and at a substantially fixed differential of cabin over ambient pressure at higher altitudes.

13. In a control system for a pressurized aircraft cabin having an air outlet, a pressure regulator mounted over said outlet on the ambient side of the cabin, said regulator comprising: an outlet throat extending outwardly from said cabin outlet and having an annular valve seat at its outer end; an annular diaphragm; a housing including a rim to which the periphery of said diaphragm is secured, including a central portion to which the inner margin of said diaphragm is secured, including an intermediate portion having an inner wall cooperating with the outer side of said diaphragm to define a control chamber, and including means defining a bellows chamber, said central housing portion being disposed between said throat and bellows chamber, having a passage establishing unrestricted communication between said throat and said bellows chamber through the center of said diaphragm for establishing cabin pressure in said bellows chamber, and having a fixed, restricted bleed for restricted flow of air from said passage into said control chamber; said periphery and inner margin of the diaphragm being disposed substantially in a common plane located inwardly of said inner wall and outwardly of the plane of said valve seat, said diaphragm having an annular zone, intermediate said periphery and inner margin, adapted for flexing movement between a closed position seated against said valve seat, wherein cabin pressure in said throat is extered directly against the central area of the cabinward face of said diaphragm and ambient pressure is exerted directly against the peripheral area of said cabinward face, while control pressure is exerted against the entire outer face of the diaphragm in said control chamber, to an open position, in which said throat is placed in direct communication with said regulator outlet for outflow radially outwardly across said valve seat; a pair of control pilots each including a valve unit having an inlet side communicating directly with said control chamber and a bellows disposed in said bellows chamber, one of said bellows being an aneroid responding to changes of cabin pressure in said bellows chamber and the other being a differential pressure bellows externally subjected to said cabin pressure in the bellows chamber and internally connected to ambient pressure through said housing so as to respond to the differential between cabin and ambient pressure; said housing having passage means for escape of air from the outlet sides of the respective pilot valve units directly to ambient pressure outside the housing; said bellows being associated with said valve units for operating the same to modulate the pressure in said control chamber so as to maintain equilibrium in said diaphragm in a manner to control cabin pressure at a relatively fixed value for intermediate altitude operation of the airplane and at a substantially fixed differential of cabin over ambient pressure at higher altitudes.

14. A regulator as defined in claim 13, wherein said central housing portion has an end portion facing said throat and proving an annular diaphragm seat; and including an annular securing element attached to said central housing portion in opposed relation to said diaphragm seat, said inner margin of the diaphragm being clamped between said diaphragm seat and securing element.

15. A regulator as defined in claim 14, including an air filter carried by said securing element and traversing said passage to isolate said bellows chamber from airborne particles in the cabin atmosphere.

16. A regulator as defined in claim 13, wherein said central housing portion is in the form of a tubular member projecting toward said throat from said intermediate housing portion, with its outer surface defining a radially inner wall of said control chamber.

17. A regulator as defined in claim 13, wherein said central housing portion is in the form of a tubular member projecting toward said throat from said intermediate housing portion, with its outer surface defining a radially inner wall of said control chamber; and an air filter disposed within said tubular member and traversing said passage to isolate said bellows chamber from air-borne particles in the cabin atmosphere.

18. A regulator as defined in claim 13, wherein said central housing portion is in the form of a tubular member projecting toward said throat from said intermediate housing portion, with its outer surface defining a radially inner wall of said control chamber, said tubular member having an end portion facing said throat and defining a seat; an annular securing element attached to said central housing portion in opposed relation to said diaphragm seat, said inner margin of the diaphragm being clamped between said diaphragm seat and securing element; an integral annular shoulder on said diaphragm, opposite said valve seat and projecting into said control chamber; and a light frusto-conical coil spring having an end coil of maximum diameter engaged within said shoulder and exerting light compressive force against said diaphragm, and having an end coil of minimum diameter piloted around said tubular member and abutted against the housing near the junction of said tubular member and inner wall of the intermediate housing portion.

19. A regulator as defined in claim 13, wherein said diaphragm is provided on its control chamber side with an annular shoulder in opposed relation to said valve seat, and including a light coil spring having respective ends in piloted association with said shoulder and with said intermediate housing portion and under compression between the housing and diaphragm for exerting light closing pressure against the diaphragm at the diameter of said valve seat.

References Cited in the file of this patent

UNITED STATES PATENTS

| | | |
|---|---|---|
| 2,463,487 | Widgery et al. | Mar. 1, 1949 |
| 2,463,492 | Arthur | Mar. 1, 1949 |
| 2,672,085 | Fischer | Mar. 16, 1954 |